US010832240B2

(12) United States Patent
Sarradin

(10) Patent No.: US 10,832,240 B2
(45) Date of Patent: Nov. 10, 2020

(54) METHODS FOR PROCESSING TRANSACTIONAL DATA, AND CORRESPONDING DEVICES AND PROGRAMS

(71) Applicant: INGENICO GROUP, Paris (FR)

(72) Inventor: Jean-Louis Sarradin, Etables (FR)

(73) Assignee: INGENICO GROUP, Paris (FR)

( * ) Notice: Subject to any disclaimer, the term of this patent is extended or adjusted under 35 U.S.C. 154(b) by 617 days.

(21) Appl. No.: 15/304,714

(22) PCT Filed: Apr. 10, 2015

(86) PCT No.: PCT/EP2015/057837
§ 371 (c)(1),
(2) Date: Oct. 17, 2016

(87) PCT Pub. No.: WO2015/158619
PCT Pub. Date: Oct. 22, 2015

(65) Prior Publication Data

US 2017/0039558 A1 Feb. 9, 2017

(30) Foreign Application Priority Data

Apr. 18, 2014 (FR) ...................................... 14 53569

(51) Int. Cl.
*G06K 7/00* (2006.01)
*G06Q 20/38* (2012.01)
(Continued)

(52) U.S. Cl.
CPC ....... *G06Q 20/3829* (2013.01); *G06F 16/245* (2019.01); *G06Q 20/02* (2013.01);
(Continued)

(58) Field of Classification Search
USPC .......................... 235/375–385; 705/5, 35–45
See application file for complete search history.

(56) References Cited

U.S. PATENT DOCUMENTS

2003/0163699 A1* 8/2003 Pailles ................. G06Q 20/341
713/172

FOREIGN PATENT DOCUMENTS

| | | | |
|---|---|---|---|
| EP | 1124208 | A2 | 8/2001 |
| EP | 1134707 | A1 | 9/2001 |
| WO | 2015145131 | A1 | 10/2015 |

OTHER PUBLICATIONS

International Search Report from PCT/EP2015/057837, dated Jun. 18, 2015, Bauer, Rodolphe.

(Continued)

*Primary Examiner* — Matthew Mikels
(74) *Attorney, Agent, or Firm* — David D. Brush; Westman Champlin & Koehler, P.A.

(57) ABSTRACT

The invention relates to a method for processing transactional data, implemented within a secured intermediate server, connected to a communications network. Such a method comprises:

reception, by the secured intermediate server, of a request for payment comprising a piece of data representing an identification of a communications terminal used by a user to carry out a purchase operation with a merchant server connected to said communications network;

setting up a secured point-to-point link with a payment module of the communications terminal;

transmission, to said payment module, of a request for execution of payment;

reception, by the payment module, of a piece of information on payment;

transmission of a message of information to the merchant server.

4 Claims, 3 Drawing Sheets

TC
ModP
SRI
RqP
SM
IdTC
100
120
RqEP
LS
140
CarDM
InfP
160
Msgl
180

(51) Int. Cl.

| | |
|---|---|
| ***G06F 16/245*** | (2019.01) |
| ***G06Q 20/22*** | (2012.01) |
| ***G06Q 20/32*** | (2012.01) |
| ***G06Q 20/02*** | (2012.01) |
| ***G06Q 20/12*** | (2012.01) |
| ***G06Q 20/10*** | (2012.01) |

(52) U.S. Cl.

CPC ........... *G06Q 20/102* (2013.01); *G06Q 20/12* (2013.01); *G06Q 20/223* (2013.01); *G06Q 20/3227* (2013.01); *G06Q 20/3229* (2013.01); *G06Q 20/382* (2013.01); *G06Q 20/38215* (2013.01)

(56) References Cited

OTHER PUBLICATIONS

Urien et al., Towards a Secure Cloud of Secure Elements Concepts and Experiments With NFC Mobiles, Collaboration Technologies and Systems (CTS), 2013 International Conference on, May 20, 2013 IEEE, pp. 166-173.

Schamberger et al., Components for an Interoperable NFC Mobile Payment Ecosystem, Research Group for Industrial Software, Institute of Computer Aided Automation, Vienna University of Technology, Near Field Communication (NFC), 2013 5th International Workshop on, Feb. 5, 2013 IEEE, pp. 1-5.

Neville et al., Efficiently Achieving Full Three-Way Non-Repudiation in Consumer-Level eCommerce and M-Commerce Transactions, 2011 International Joint Conference of IEEE, Trust, Security and Privacy in Computing and Communications, TrustCom, 2011 IEEE 10th International Conference on, Nov. 16, 2011 IEEE, pp. 664-672.

Kyrillidis et al., Card-Present Transactions on the Internet Using the Samrt Card Web Server, 2013 12th IEEE International Conference on Trust, Security and Privacy in Computing and Communications, Jul. 16, 2013 IEEE, pp. 611-619.

English abstract of EP1124208 retrieved from Espacenet on Oct. 12, 2016.

Machine translation of Communication from the Examining Division dated May 15, 2018, for corresponding European Application No. 15714240.7.

* cited by examiner

METHODS FOR PROCESSING TRANSACTIONAL DATA, AND CORRESPONDING DEVICES AND PROGRAMS

CROSS-REFERENCE

This United States National Stage Patent Application of International Patent Application PCT/EP2015/057837 filed on Apr. 10, 2015 claims priority from French Patent Application Serial No. 14 53569 filed on Apr. 18, 2014, the entire content of which are incorporated herein by reference.

FIELD OF THE INVENTION

The invention relates to the field of payment. More particularly, the invention relates to online payment to merchants for goods and services, for example through an online sales platform accessible from a communications network.

PRIOR ART

Online payment for goods and services through shopping platforms has made life easier for consumers. As a rule, payment is made with a merchant by means of a payment card. More particularly, payment is made by using data indicated on the payment card (holder's name, card number, date of validity, visual cryptogram). These pieces of data are entered by the user in an online entry form which is proposed to him when he confirms his purchase. This data can be complemented. Indeed, the problem of online payment by bank card is linked to the identification and authentication of the person entering the information of the payment card. It is indeed very difficult to make sure that the person who enters the bank card data is truly the holder of this card. Systems have been implemented to overcome this problem. These systems include the 3D-Secure protocol which has received support from Visa and MasterCard and is aimed at making sure that the holder of the card is truly the person who is making the transaction. Usually, this system comprises, for the user who wishes to pay, a step for entering a complementary code. This complementary code is supposed to be known only to the user himself, either because it is a piece of personal data (such as his date of birth) or because it is a piece of data which he himself knows about (for example a code transmitted by SMS). This type of solution however raises problems. On the one hand, it has been observed that applying a 3D-Secure type solution has a negative effect on sales because it complicates the process for the user. The drop in sales may be 10% to 15%, which is far from negligible. Merchants therefore are not really tempted to adopt this type of solution.

Besides, this type of solution in no way ensures payment. Indeed, because the payment is made in "card not present" mode, i.e. without a real presence of the bank card, the transaction can be absolutely repudiated by the card holder; this means that the transaction can be cancelled after the delivery of the goods or services purchased (for example in the event of fraud, the transaction is cancelled by the holder of the card after the fraud). Normally, without 3D-Secure, the merchant loses completely when the transaction is repudiated after the delivery; all he can do is to take legal action without any great hope that this might get him payment of damages. In the event of fraud with 3D-Secure, it is the bank that accepts the risk of not receiving payment. In the event of fraud, it is therefore the bank that is the loser with the same consequences as for the merchant. This arises out of the fact that the card is not present.

There is therefore a need to provide a method enabling online purchases that cannot be repudiated, a method that is simple for the user and does not lead to any loss of sales.

SUMMARY OF THE INVENTION

The invention does not raise these prior art problems. More particularly, the invention relates to a method for processing transactional data.

The invention relates to a method for processing transactional data, implemented within a secured intermediate server, connected to a communications network. Such a method comprises:

a step of reception, by the secured intermediate server, of a request for payment comprising a piece of data representing an identification of a communications terminal used by a user to carry out a purchase operation with a merchant server connected to said communications network;

a step for setting up a secured point-to-point link with a payment module of the communications terminal;

a step of transmission, to said payment module, of a request for execution of payment;

a step of reception, by the payment module, of a piece of information on payment;

a step of transmission of a message of information to the merchant server.

According to one particular characteristic, the method for processing transactional data comprises, prior to said step for setting up a secured link:

a step for searching, within a database, for at least one piece of data representing an identifier of a payment module linked to said communications terminal by means of said piece of data representing an identification of a communications terminal;

a step for checking the validity of said payment module;

a step for obtaining at least one piece of data used to set up a secured link with said payment module when said step for checking the validity of said payment module is positive.

In another embodiment, on the customer terminal side, the technique relates to a method for processing transactional data, implemented within a payment module linked to a communications terminal and connected to a communications network. Such a method comprises:

a step of reception, by the payment module and by means of the communications terminal, of a request for setting up a secured point-to-point link with a secured intermediate server, as a function of a piece of data representing an identification of said communications terminal;

a step for setting up said secured link by means of at least one encryption key included in said payment module;

a step of reception, from the secured intermediate server, of a request for executing payment transactions;

a step of computation of a transaction certificate using encryption keys and at least one piece of data coming from a microcircuit card presented by a user to carry out the transaction;

a step of transmission of said transaction certificate to the secured intermediate server;

a step for receiving an acknowledgment corresponding to the transaction coming from said secured intermediate server.

According to one particular transaction, said step of computation of a transaction certificate comprises a step of authentication of said microcircuit card.

According to one particular characteristic, the method for processing transactional data comprises a step for the entry, by said user, of a personal identification code linked to said microcircuit card.

Thus, the processing module is capable of checking the validity of the entry of the user's code.

In another embodiment, the technique relates to a server for processing transactional data, called a secured intermediate server, this server being capable of being connected to a communications network. Such a server comprises:

means for receiving a payment request comprising a piece of data representing an identification of a communications terminal used by a user to carry out a purchase operation on a merchant server connected to said communications network;

means for setting up a secured point-to-point link with a payment module of the communications terminal;

means of transmission, to said payment module, of a request for execution of payment;

means of reception, from the payment module, of a piece of payment information;

means of transmission of an information message to the merchant server.

According to one specific embodiment, the proposed technique relates to a payment module that can be linked to a communications terminal, the terminal being possibly connected to a communications network. Such a module comprises:

means of reception, by means of the communications terminal, of a request for setting up a secured point-to-point link with a secured intermediate server;

means for setting up said secured link by means of at least one encryption key included in said payment module;

means of reception, from the secured intermediate server, of a request for executing a payment transaction;

means of computation of a transaction certificate using encryption keys and at least one piece of data coming from a microcircuit card presented by a user to carry out the transaction;

means of transmission of said transaction certificate to the secured intermediate server;

means of reception of an acknowledgment corresponding to the transaction coming from said secured intermediate server.

In general, the proposed technique relates to a method for processing transactional data, implemented within a system comprising a secured intermediate server, connected to a communications network and a payment module linked to a communications terminal connected to said communications network, the method being characterized in that it comprises:

a step of reception, by the secured intermediate server, of a request for payment comprising a piece of data representing an identification of a communications terminal used by a user to carry out a purchase operation on a merchant server connected to said communications network;

a step of reception, by the payment module and by means of the communications terminal, of a request for setting up a secured point-to-point link with the secured intermediate server, as a function of said piece of data representing an identification of said communications terminal;

a step for setting up a secured point-to-point link with said payment module of said communications terminal;

a step of transmission, to said payment module, by the secured intermediate server, of a request for execution of payment;

a step of reception, from the secured intermediate server, by said payment module, of said request for execution of payment;

a step of computation, by said payment module, of a transaction certificate in using encryption keys and at least one piece of data coming from a microcircuit card and presented by a user to make the transaction;

a step of transmission of said transaction certificate to the secured intermediate server;

a step of reception from the payment module, by the secured intermediate server, of a piece of data-processing information;

a step of transmission of an information message to the merchant server;

a step of reception, by said payment module, of an acknowledgment corresponding to the transaction coming from said secured intermediate server.

In another embodiment, the proposed technique relates to a system for processing transactional data comprising a secured intermediate server, connected to a communications network and a payment module linked to a communications terminal connected to said communications network, the system being characterized in that it comprises:

means of reception, by the secured intermediate server, of a request for payment comprising a piece of data representing an identification of a communications terminal used by a user to carry out a purchase operation with a merchant server connected to said communications network;

means of reception, by the payment module and by means of the communications terminal, of a request for setting up a secured point-to-point link with an intermediate secured server, as a function of said piece of data representing an identification of said communications terminal;

means for setting up a secured point-to-point link with said payment module of the communications terminal;

means of transmission, to said payment module, by the secured intermediate server, of a request for execution of payment;

means of reception, from the secured intermediate server, by said payment module, of said request for executing payment;

means of computation, by said payment module, of a transaction certificate using encryption keys and at least one piece of data coming from a microcircuit card presented by a user in order to carry out the transaction;

means of transmission of said transaction certificate to the secured intermediate server;

means of reception, from the payment module and by the secured intermediate server, of a piece of data-processing information;

means of transmission of an information message to the merchant server;

means of reception, by said payment module, of an acknowledgment corresponding to the transaction coming from said secured intermediate server.

The methods and devices presented are quite naturally complementary.

According to one preferred implementation, the different steps of the method according to the invention are implemented by one or more software computer programs comprising software instructions to be executed by a data processor of a relay module according to the invention and being designed to command the execution of different steps of the methods.

The invention is therefore aimed at providing a program capable of being executed by a computer or a data processor, this program comprising instructions to command the execution of the steps of a method as mentioned here above.

This program can use any programming language whatsoever and can be in the form of a source code, object code or intermediate code between source code and object code, such as in a partially compiled form or in any other desirable form whatsoever.

The invention also seeks to provide an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the invention can especially be uploaded to an Internet type network.

As an alternative, the information carrier can be an integrated circuit into which the program is incorporated, the circuit being adapted to executing or to being used in the execution of the method in question.

According to one embodiment, the invention is implemented through software and/or hardware components. In this respect, the term "module" can correspond in this document equally well to a software component as to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router, etc.) and is capable of accessing the hardware resources of this physical entity (memories, recording media, communications buses, input/output electronic boards, user interfaces, etc.).

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

The different embodiments mentioned here above can be combined with each other to implement the invention.

FIGURES

Other features and advantages shall appear more clearly from the following description of a preferred embodiment, given by way of a simple illustratory and non-exhaustive example and from the appended drawings, of which:

Figure 3:
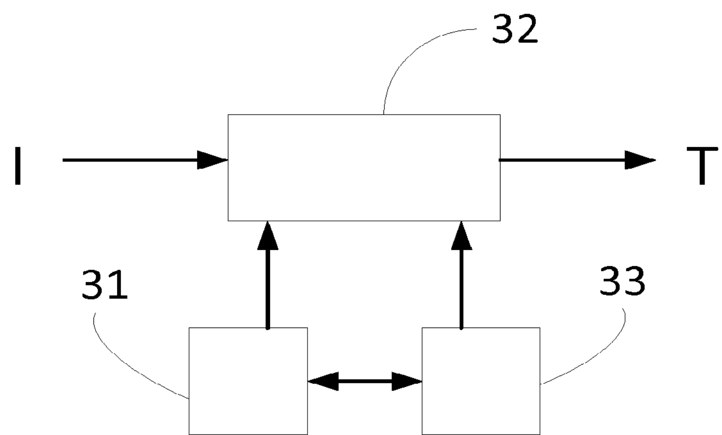
Figure 4:
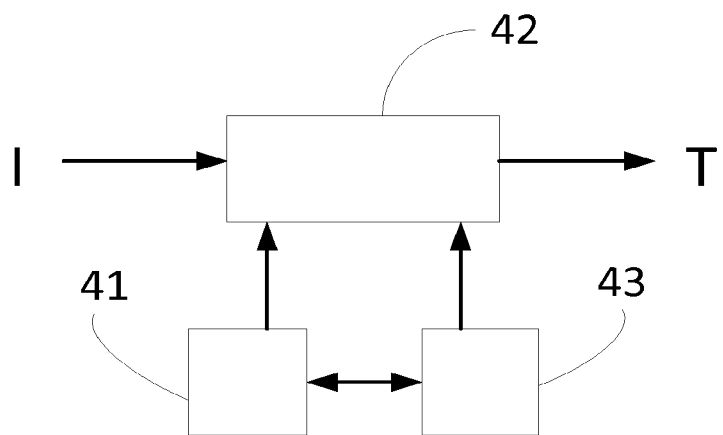

FIG. 3 describes a secured intermediate server of a transaction;

FIG. 4 describes a payment module.

DESCRIPTION

In a classic remote shopping transaction, the user links up with a merchant site via a communications terminal that enables him to exchange data (conventionally this is a PC, tablet etc. connected locally or remotely to the Internet) to select the item or the service that he wishes to purchase. When making payment for the item/service selected, the user who wishes to pay by card must communicate his card identification data (classically the PAN, the date of validity and the cryptogram) through the merchant site. In the best case, the stream of information is redirected from the merchant site to a secured site, thus preventing the transmission of sensitive data to the merchant site. In other cases, generally private systems enabling payment between a group of subscribers, it is not bank data but equivalent data that is communicated, ultimately enabling the transfer of money between the customer's account and the merchant's account. In all these cases, in addition to the notion of securing information transmitted by the user, there is still the problem of the repudiation of payment by the user and hence the fact that there is no guarantee that payment will be made to the merchant.

Figure 1:
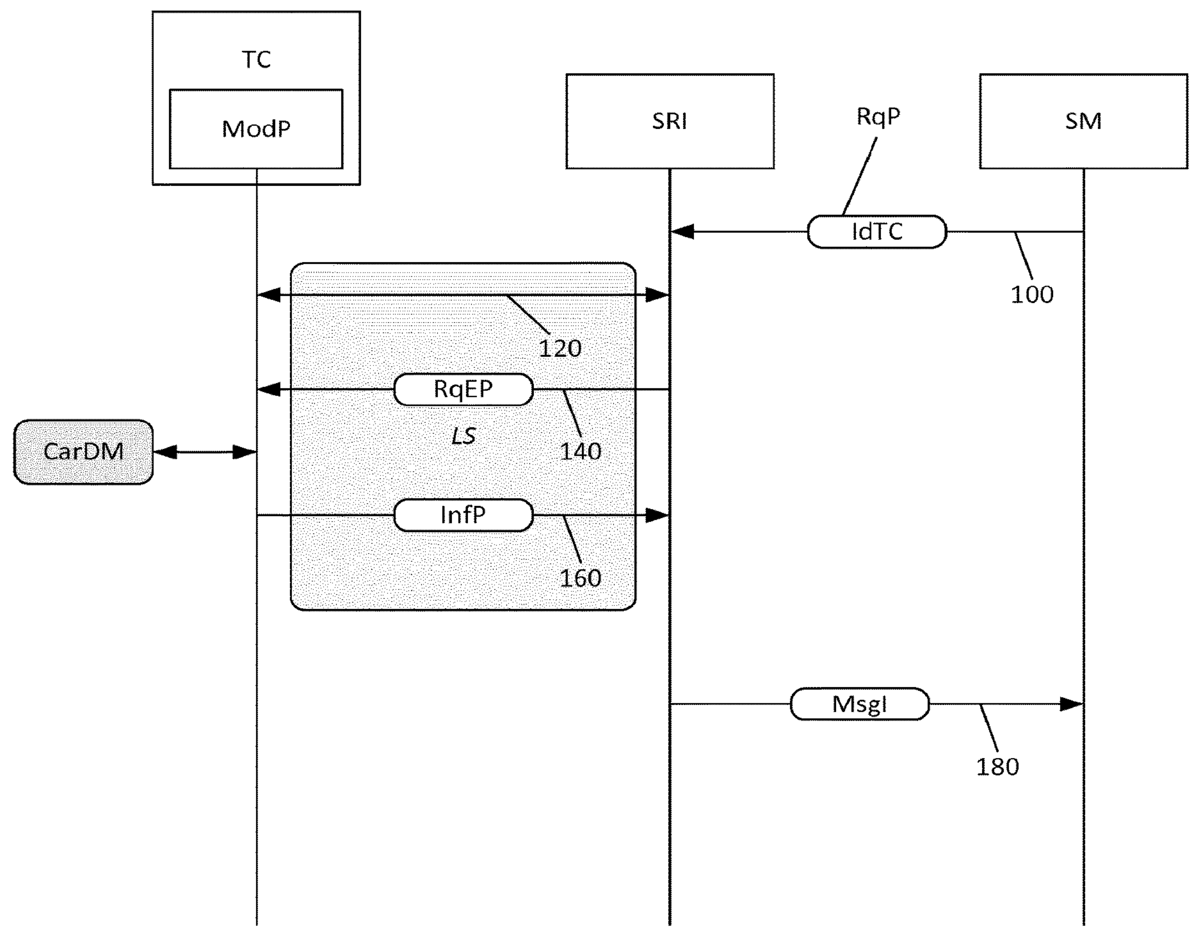
FIG. 1 is a block diagram of the proposed technique from the viewpoint of the secured intermediate server.

The present technique, presented with reference to FIG. 1, relies on the application of a principle of proximity payment by bank card (secured, guaranteed, non-repudiable) to carry out remote payment. The problem presented here above is resolved by using a payment module (ModP) containing security mechanisms proper to a classic payment terminal and capable of processing a transaction by microcircuit card. This payment module (ModP) is connected or integrated with the user's communications terminal, (TC) (PC, tablet etc.).

After the shopping transaction phase performed via open networks (for example the Internet) between the communications terminal TC (PC/tablet) and the merchant's site SM, the latter triggers the payment phase.

This payment phase starts with the reception (100), by a secured intermediate server (SRI) (gateway server) of a message requesting payment (also called a payment request RqP). This message comes from the merchant site SM (or from one of the servers of the merchant site). Thus, instead of transmitting the user's bank data (as is conventionally done) the merchant's site SM transmits information on the shopping transaction (amount to be paid etc). The payment request RqP also includes an identification of the communications terminal (IdTC) used by the user (this IdTC identification is explained here below).

The secured intermediate server (SRI) then sets up (120) a point-to-point secured link (LS) with the payment module (ModP) of the communications terminal (TC). This link is set up through the identification IdTC of the communications terminal TC. When the secured link is set up, the secured intermediate server (SM) transmits (140) a request for execution of payment (RqEP) to the payment module (ModP). The payment transaction is made by the payment module (ModP) with the user's microcircuit card (CardM), using mechanisms similar to those used on a classic payment terminal with a merchant.

When the transaction is made without error, the secured intermediate server (SRI) receives (160) a piece of payment information (InfP) from the payment module (ModP). This payment information (InfP) comprises at least one piece of data representing acceptance or refusal of payment. The process for obtaining this piece of information is described here below.

The transaction ends with a transmission (180), by the secured intermediate server (SRI), of an information message (MsgI) to the merchant's site (SM). This information message (MsgI) includes a piece of information representing the result of the transaction that has been made. If the transaction was made successfully, the merchant site can deliver the item/service. Since the mechanisms used to carry out the transaction are identical to those of a payment terminal with the merchant, the user cannot reject the transaction solely on the grounds that this is a long-distance sales payment as is the case with present-day solutions.

Thus a secured point-to-point communications channel is set up between the secured intermediate server on the one hand and the payment module on the other hand. This point-to-point channel permits secured exchange between data on the financial transaction between two entities which are themselves secured, namely the secured intermediate server and the payment module. Besides, this method for processing transactional data implies a strict separation of the commercial streams on the one hand (respectively between the communications terminal and the merchant server) and, on the other hand, the payment streams (respectively between the communications terminal and the secured intermediate server). It is thus ensured that the merchant server does not possess the user's bank card data. It is also ensured that the payment cannot be made without physical possession of the microcircuit card.

Setting up the secured communications channel between the payment module and the secured intermediate server relies, according to an embodiment of the proposed technique, on several elements, the first of which is the identification of the communications terminal. This identification enables the secured intermediate server to recognize the communications terminal and link up with it.

In a basic embodiment, the communications terminal is identified by its IP address. In a complementary embodiment, the identification relies on the MAC address of the hardware module used by the communications terminal to carry out the transmission of data (for example, the MAC address of the Wi-Fi communications hardware module or the MAC address of the Ethernet card). In another embodiment, the identification of the communications terminal is made by a URL re-routing mechanism for re-routing from the merchant's server to the secured intermediate server. This re-routing mechanism is supplemented by the transmission, from the merchant server to the intermediate server, of session data, this session data comprising for example, the user's surname and first name, an IP address, or even a customer account number (with the merchant). From the data transmitted by the merchant site, the secured intermediate server identifies the payment module in a database and transmits a request, on a specific communications interface (for example a UDP/IP specific port) of the communications terminal, for setting up a secured point-to-point communications channel. As explained here below, the payment module "listens to" this specific interface and gets activated during the reception of this request.

Figure 2:
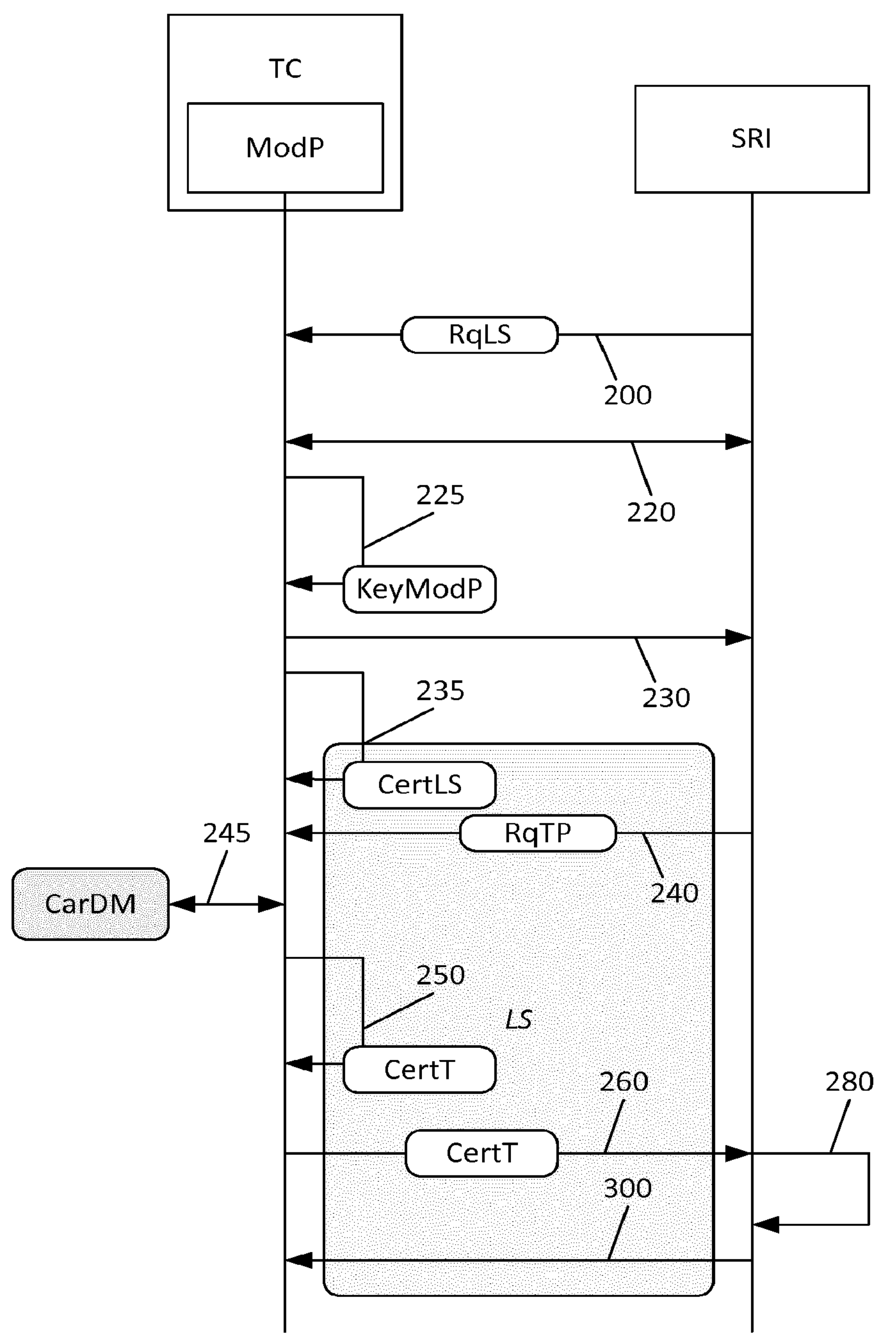
FIG. 2 is a block diagram of the proposed technique from the viewpoint of the payment module.

The working of the payment module is described with reference to FIG. 2. As indicated here above, the communications terminal is equipped with a payment module. In the first embodiment, this payment module is a particular programmable electronic component inserted within the communications terminal (soldered to a mother board of the communications terminal). This physical payment module comprises an independent processing unit, secured storage space and communications interfaces. More particularly, the payment module, whatever its implementation, comprises a communications interface with a contactless data reader. This communications interface, called a contactless communications interface, activates a contactless reading module. This contactless reading module is the one used to interface with the microcircuit card (which therefore comprises contactless communications means). As an alternative, the contactless data reader forms part of the payment module. The payment module then comprises a link to a contactless antenna implemented within the terminal.

This module also comprises mechanisms to ensure the secured storage of the encryption elements that are used on the one hand to ensure secured transmission with the secured intermediate server and on the one hand to ensure secured payment transaction with the customer's microcircuit card. The mechanisms furthermore ensure that the sensitive data contained in the payment module (encryption keys etc) will not be accessible. Finally, the payment module has available executable codes enabling it to ensure the processing of the user's microcircuit card and exchanges with the secured intermediate server.

From the viewpoint of the payment module, the payment phase starts with the reception (200), by the payment module (ModP) and through the communications terminal (TC), of a request (RqLS) for setting up a secured link (LS) which is a point-to-point link with the secured intermediate server (SRI).

To set up (220) the secured link (LS), this payment module (ModP) uses (225) encryption keys (KeyModP) in order to authenticate (230) the secured intermediate server (SRI) and to generate (235) certificates (CertLS) enabling the setting up of the secured link (LS).

When the secured link (LS) is set up, the payment module (ModP) receives (240) from the secured intermediate server (SRI), a request for executing a payment transaction (RqTP). Upon reception of this request, the payment module (ModP):

checks (245) the microcircuit card: more specifically, it verifies that the contactless card is present and that the information that it contains is formed validly;

computes (250) the transaction certificate (CertT) by using encryption keys (KeyModP).

Optionally, the payment module (ModP) asks for the entry of a personal identification code on the communications terminal. This entry is done in special conditions of isolated entry. More particularly, the payment module comprises means for intercepting entries made on the communications terminal. Optionally, the payment module (ModP) asks for an authorization from a control center accessible through the secured link (LS).

Subsequently to the computation of the transaction certificate, the payment module (ModP) transmits (260) the transaction certificate (CertT) to the secured intermediate server (SRI).

The secured intermediate server (SRI) receives the transaction certificate, carries out the financial processing of the transaction and transmits the necessary acknowledgments, especially to the payment module (ModP) and to the merchant site (SM).

The payment module (ModP) receives (280) the acknowledgement corresponding to the payment transaction. The payment module (ModP) dismantles (300) the secured link (LS).

Referring to FIG. 3, a description is provided of a secured intermediate server implemented to carry out the transactions, from the server's viewpoint, according to the method described here above.

For example, the server comprises a memory 31 constituted by a buffer memory, a processing unit 32, equipped for example with a processor and driven by the computer programme 33 implementing a method for processing transactional data.

At initialization, the code instructions of the computer programme 33 are for example loaded into a memory and then executed by the processor of the processing unit 32. The processing unit 32 inputs at least one piece of data representing an identifier of the user and one piece of data representing a transaction amount. The microprocessor of the processing unit 32 implements the steps of the method for processing data representing transactions, according to the instructions of the computer programme 33 to carry out a validation of transaction (entailing searching for the payment module, setting up the secured link, transmitting requests).

To this end, the server comprises, in addition to the buffer memory 31, communications means such as network communications modules, data transmission means and possibly an encryption processor.

These means can take the form of a particular processor implemented within the server, said processor being a secured processor. According to one particular embodiment, this server implements a special application which is in charge of carrying out transactions, this application being for example, provided by the manufacturer of the processor in question in order to enable the use of said processor. To this end, the processor comprises unique identification means. These unique identification means make it possible to ensure the authenticity of the processor.

Besides, the server also comprises means for identifying and validating payment modules. These means also take the form of communications interfaces used to exchange data on communications networks, means for interrogating and updating databases, means for comparing the localization data(for example on the basis of the IP address of the payment modules).

Referring to FIG. 4, we describe a payment module (transactional data processing module) implemented to carry out transactions according to the method described here above.

For example, the payment module comprises a memory 41 constituted by a buffer memory, a processing unit 42 equipped for example with a microprocessor and driven by the computer programme 43, implementing a method for processing transactional data.

At initialization, i.e. when the communications terminal to which the payment module is connected is powered on, the code instructions of the computer programme 43 are for example loaded into a memory and then executed by the processor of the processing unit 42. The processing unit 42 inputs at least one piece of data representing a request for initializing a secured link. The microprocessor of the processing unit 42 implements the steps of the method for processing transactional data according to the instructions of the computer programme 43 to carry out a validation of transactions with a microcircuit card, such as a contactless payment card.

To this end, the device comprises, in addition to the buffer memory 41, communications means such as network communications modules, data transmission means and possibly an encryption processor capable of implementing cryptographic algorithms such as the RSA algorithm.

In one particular embodiment of the invention, the user's payment module, which can be integrated (i.e. physically soldered or joined) to a smartphone, a tablet, a laptop computer, a PDA, integrates means for managing transactions as described here above. These means can take the form of a particular processor implemented within the payment module, said processor being a secured processor. According to one particular embodiment, this payment module implements a particular application which is in charge of the management of transactions, this application being provided for example, by the manufacturer of the processor in question in order to enable the use of said processor. To this end, the processor comprises unique identification means. These unique identification means make it possible to ensure the authenticity of the processor and, on a complementary basis, to manage the payment module from the secured intermediate server. In another embodiment, the management application installed on the payment module also comprises unique identification means capable either of ensuring the authenticity of the application or of ensuring the identification of the carrier of the payment module, or of fulfilling both functions.

The invention claimed is:

1. A method for processing transactional data, implemented within a payment module linked to a communications terminal and connected to a communications network, the method comprising:

receiving, by the payment module and by using the communications terminal, a request for setting up a secured point-to-point link with a secured intermediate server, as a function of a piece of data representing an identification of said communications terminal;

setting up said secured link by using at least one encryption key included in said payment module;

receiving, from the secured intermediate server, a request for executing payment transactions;

processing a transaction certificate using encryption keys and at least one piece of data coming from a microcircuit card presented by a user to carry out the transaction;

transmitting said transaction certificate to the secured intermediate server; and receiving an acknowledgment corresponding to the transaction coming from said secured intermediate server.

2. The method for processing transactional data according to claim 1, wherein processing a transaction certificate comprises authenticating said microcircuit card.

3. The method for processing transactional data according to claim 1, further comprising entering, by said user, of a personal identification code linked to said microcircuit card.

4. A payment module that can be linked to a communications terminal, the module comprising:

a processor; and a non-transitory computer-readable medium comprising instructions stored thereon which when executed by the processor configure the payment module to:

receive, by using the communications terminal, a request for setting up a secured point-to-point link with a secured intermediate server;

set up said secured link by using at least one encryption key included in said payment module;

receive, from the secured intermediate server, a request for executing a payment transaction;

process a transaction certificate using encryption keys and at least one piece of data coming from a microcircuit card presented by a user to carry out the transaction;

transmit said transaction certificate to the secured intermediate server; and receive an acknowledgment corresponding to the transaction coming from said secured intermediate server.

* * * * *